United States Patent
Hymel et al.

(12) 
(10) Patent No.: US 6,366,665 B1
(45) Date of Patent: Apr. 2, 2002

(54) REMOTE ACD DATA BASE MODIFICATION VIA TELEPHONE

(75) Inventors: Darryl Hymel, Batavia; Tim Moore, Naperville, both of IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/505,206

(22) Filed: Feb. 16, 2000

Related U.S. Application Data

(60) Provisional application No. 60/122,229, filed on Mar. 1, 1999.

(51) Int. Cl.[7] ........................... H04M 3/523; H04M 1/64
(52) U.S. Cl. .............................. 379/265.03; 379/88.01; 379/88.16; 379/265.05
(58) Field of Search ....................... 379/265.02, 265.03, 379/265.05, 265.06, 266.01, 88.01, 88.16

(56) References Cited

U.S. PATENT DOCUMENTS

| 5,153,909 A | * 10/1992 | Beckle et al. ................ 379/265 |
| 5,978,465 A | 11/1999 | Corduroy et al. ........... 379/265 |
| 6,134,318 A | * 10/2000 | O'Neil ........................ 379/266 |

* cited by examiner

*Primary Examiner*—Harry S. Hong
(74) *Attorney, Agent, or Firm*—Welsh & Katz, Ltd.

(57) ABSTRACT

A method and apparatus are provided for allocating resources within an automatic call distributor. The method includes the steps of receiving an incoming call from a supervisor on a voice channel of the automatic call distributor and routing the incoming call to an autoattendant of the automatic call distributor. The method further includes the steps of presenting the supervisor with a set of options regarding the allocation of resources within the automatic call distributor, receiving a change request from the supervisor and executing the change request.

28 Claims, 1 Drawing Sheet

REMOTE ACD DATA BASE MODIFICATION VIA TELEPHONE

This is a non provisional application, from provisional application Serial No. 60/122,229, filed Mar. 1, 1999. The field of the invention relates to telecommunication systems and more particularly to automatic call distributors.

FIELD OF THE INVENTION

Background of the Invention

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In other systems, where skill is considered essential for call handling, a call may be directed to an agent group considered the most skilled for the call considered. In these systems, a database of customer records is maintained. Customers are identified to the ACD and database by features such as automatic number identifier (ANI).

In order to staff an ACD, an organization often relies on historical levels (in Erlangs) of incoming calls to the individual call targets. A manager of the ACD may examine the historical call loading records, add or subtract a percentage of the historical loading based upon a most recent call history (e.g., the most recent week or month), and estimate a staffing level based upon those calculations. Alternatively, some organizations have relied upon commercially available predictive software (i.e., force management packages) which calculates daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group is separately staffed based upon an Erlang estimate for that group.

As an alternative to staffing individual groups, some systems group all agents together and assign a skill rating to each agent. Calls are then assigned based upon the skill rating of the agent for handling that type of call.

For example, where a single group is used, an ACD will always look for and assign the call to the most qualified agent. However, some agents are more qualified than others. Because of the differences in qualifications, some agents receive more calls than others, resulting in an inequitable work load.

Further, where all agents are grouped together, an Erlang rate for any one group becomes irrelevant. For example, one benefit of using a common group relates to economies of scale. Two separate groups that separately require 10 agents each would typically only require 18 agents from a common pool of agents.

Further, it is difficult, if not impossible for call center management to known how many agents are serving a particular call target. Because of the difficulty of determining agent loading, it is also difficult to project staffing requirements in a shared agent environment.

Where all agents are grouped together, staffing estimates must be based upon an Erlang rate of the organization as a whole. Basing a staffing estimate upon an organization as a whole is subject to large errors. Because of the importance of call handling through ACDs, a need exists for a method of re-assigning agents from a remote location.

SUMMARY

A method and apparatus are provided for allocating resources within an automatic call distributor. The method includes the steps of receiving an incoming call from a supervisor on a voice channel of the automatic call distributor and routing the incoming call to an autoattendant of the automatic call distributor. The method further includes the steps of presenting the supervisor with a set of options regarding the allocation of resources within the automatic call distributor, receiving a change request from the supervisor and executing the change request.

DETAILED DESCRIPTION OF A PREFERRED EMBODIMENT

Figure 1:
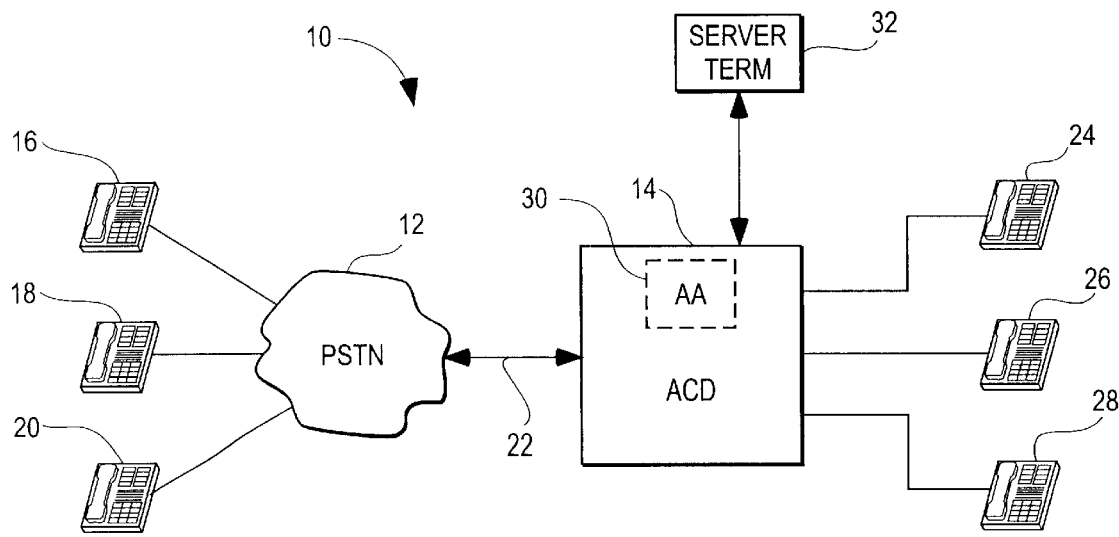
FIG. 1 is a block diagram of an automatic call distributor in accordance with an illustrated embodiment of the invention.

FIG. 1 is a block diagram of a telephone system 10, generally, in accordance with an illustrated embodiment of the invention. Under the illustrated embodiment, an automatic call distributor (ACD) 14 (e.g., a TRANSCEND ACD sold by Rockwell International) may receive calls from any of a number of caller 16, 18 and automatically distribute the calls to any of a number of agents 24, 26, 28.

While three telephones 24, 26, 28 are shown in FIG. 1, it is to be understood that each telephone 24, 26, 28 may represent a group of telephones where each telephone is assigned to an agent. Each group of telephones may represent a group of agents with a particular type of expertise in handling a particular type of customer problem.

For example, a first group 24 may include agents with expertise in accepting orders, a second group 24 may have expertise in customer service and a third group 28 may have expertise in handling customer complaints. The ACD 14 may identify and route calls to these groups based upon a number of factors. For example, automatic number identification (ANI) or dialed number identification service (DNIS) may be used to identify a call target and be used to route the call.

Alternatively, an automatic attendant (autoattendant) 30 within the ACD 14 may answer a call and present a number of options to a caller. The caller may select an option by pressing a particular button on a touch-tone telephone to select one of the presented options.

Call assignment to a group 24, 26, 28 may be made upon ANI, DNIS, information collected by the autoattendant 30, or any combination of such information. Selection of an agent within a group 24, 26, 28 may be based any appropriate algorithm (e.g., the agent idle the longest).

During operation of the ACD 14, the call loading level may vary widely. To accommodate short term overload, a number of call queues may be provided for each call group 24, 26, 28. If a call should remain in a call queue too long, the call may be overflowed to another ACDs 14 (not shown).

Because of the wide variability in ACD operation, resources may need to be periodically reallocated. For example, agents may need to be shifted from one group (e.g., 24) to another group (e.g., 26). Alternatively, where the ACD is lightly loaded (e.g., because it is in a different time zone), it may be advisable to adjust threshold limits on at least some call queues to overflow calls more quickly.

In order to reallocate resources, a feature is provided within the ACD 14 by which a supervisor (not shown) may reallocate resources of the ACD 14 from a remote location. Under the feature, a supervisor may access the ACD 14 by entering a telephone number of the ACD 14 through any telephone (e.g., 20) that may be connected to the ACD 14 through the PSTN 12.

The number entered through the telephone 20 is received by the PSTN 12. The PSTN 12 decodes the number and delivers the call to the ACD 14 along with any associated information (e.g., ANI, DNIS, etc.).

Figure 2:
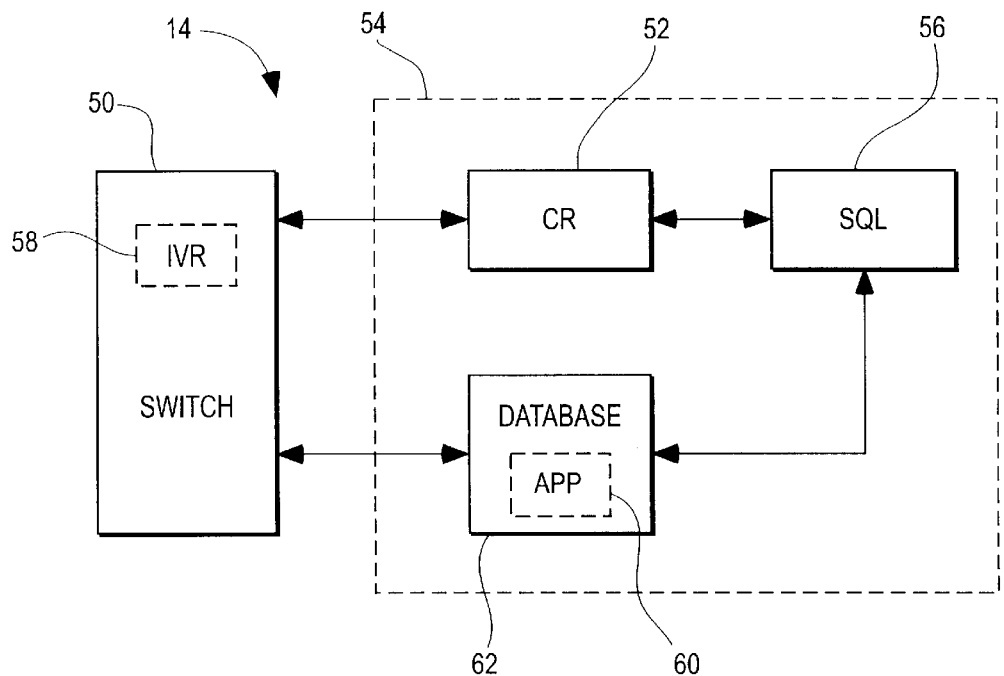
FIG. 2 depicts a controller and switch of the automatic call distributor of FIG. 1.

Within the ACD 14, a switch 50 (FIG. 2) detects the incoming call on an incoming trunk 22 along with any associated information. Based upon the associated information, the switch may deliver the call to an autoattendant 30 in a manner similar (or identical) to any other call.

Once connected to the autoattendant 30 (or while in queue if not connected to the autoattendant 30, the supervisor may enter a personal identification number (PIN). Whether connected to an autoattendant 30 or waiting in a queue, the ACD 14 may provide an integrated voice response (IVR) unit 58 to detect the entry of digits through the voice connection.

Entry of the PIN of the supervisor allows the supervisor to retrieve statistics regarding ACD operation (e.g., average calls per hour for each agent group, average time to answer, time in queue, etc.). Based upon the statistics, the supervisor is able to reallocated resources within the ACD 14 as necessary to optimize performance of the ACD 14.

Upon detecting the entered digits, the switch 50 compares the entered digits to lists of digits in a lookup table. Where a match is found for the PIN number entered by the supervisor, the switch 50 retrieves an application service identifier (ASI) of an ACD statistics application 60 within a database 62 of a controller 54 of the ACD 14. Upon identification of the ACD statistics application 60, the switch 50 transfers control of the voice channel to the application 60 identified by the ASI.

Upon transfer of control of the voice channel to the application, the application 60 causes the controller 54 to present the statistics to the supervisor in audio form. To present the statistics, the application 60 compiles the statistics (if not already compiled on a regular basis) and transfers the statistics to the IVR 58. The IVR 58 in turn presents the statistics to the supervisor.

At the end of the statistics presentation, the IVR 58 asks the supervisor if he wants to make a change in resource allocation. The IVR 58 then monitors the voice channel for a response. For instance, the IVR 58 may say "PRESS 1 TO MAKE CHANGES OR PRESS ANY OTHER NUMBER TO TERMINATE CONNECTION".

If the supervisor presses "1", the entered number is transferred from the IVR 58 to the application 60. The application 60 by reference to a lookup table retrieves another ASI identifying a change routine (CR) application 52. The application 60 transfers control of the voice channel to the CR application 52.

Upon taking control of the voice channel, the CR application 52 transfers a set of instructions to the supervisor through the phone 20. The instructions may offer a number of choices of types of resources which may be reallocated (e.g., "PRESS 1 TO CHANGE COMPOSITION OF AGENT GROUPS, PRESS 2 TO CHANGE QUEUING PARAMETERS", etc.).

In response, the supervisor may press "1". The CR application 52 may then ask the supervisor which group he wishes to change. The choices may be in the form of "PRESS 1 TO CHANGE SALES GROUP, PRESS 2 TO CHANGE SERVICE GROUP, PRESS 3 TO CHANGE OTHER GROUPS". The supervisor may make a selection of a particular group.

Upon selecting a group, the supervisor may be asked to identify an agent to be moved from one group to another. To accomplish the move, the CR application 52 may recite a list of agent names and an identifying number for each agent. The supervisor may select an agent (e.g., Smith) to be moved by entry of the agent's number.

The CR application 52 may respond with an audio message reciting a current assignment (e.g., "MR. SMITH IS CURRENTLY ASSIGNED TO SALES. ENTER 1 IF YOU WISH TO MAKE A CHANGE. ENTER ANY OTHER NUMBER TO RETURN TO A PRIOR MENU"). If the supervisor presses "1", the CR application 52 may respond with a set of assignment options (e.g., "PRESS 1 TO SELECT SALES, PRESS 2 TO SELECT SERVICE", etc.).

If the supervisor selects "2", the CR application 52 may respond with "ENTER 1 IF YOU WISH TO ASSIGN MR. SMITH TO SALES. PRESS ANY OTHER NUMBER TO RETURN TO A PRIOR MENU.".

The supervisor may press "1"to complete the reallocation. To return to a top of the change menu, the supervisor may repeatedly press "0". At the top of the menu, the CR application 52 may offer to return the supervisor to the statistics presentation application 60 (e.g., "PRESS 1 TO RETURN TO STATISTICS, PRESS ANY OTHER NUMBER TO MAKE OTHER CHANGES").

To make collect information and make changes, the CR application 52 composes a series of messages which it exchanges with a database 62 of the controller 54. The exchange of information and entry of changes between the CR application 52 and database 62 is facilitated by formulating the messages in standard query language (SQL). The use of SQL allows changes to be made to a resource base of the ACD 14 from a remote location in a manner does not require the development of a specialized interface with the database 62. The combination of the CR application and SQL allows for a simplified method of resource reallocation by a supervisor from a remote location that greatly reduces any requirement for continuous supervisory presence at a location of the ACD 14.

A specific embodiment of a method and apparatus for a method of allocating resources within an automatic call distributor has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of allocating resources within an automatic call distributor, such method comprising the steps of:
   receiving an incoming call from a supervisor on a voice channel of the automatic call distributor;
   routing the incoming call to an autoattendant of the automatic call distributor;
   presenting the supervisor with a set of options regarding the allocation of resources within the automatic call distributor;
   receiving a change request from the supervisor; and
   executing the change request.

2. The method of allocating resources as in claim 1 further comprising the autoattendant receiving a personal identification number entered by the supervisor.

3. The method of allocating resources as in claim 2 further comprising comparing the personal identification number entered by the supervisor with entries of a list of authorized personal identification numbers for reallocating resources within the automatic call distributor.

4. The method of allocating resources as in claim 3 further comprising retrieving an application service identifier of a statistics application in response to finding a match between the personal identification number of the supervisor and an entry within the list of authorized personal identification numbers.

5. The method of allocating resources as in claim 4 further comprising transferring control of the autoattendant servicing the supervisor to the statistics application.

6. The method of allocating resources as in claim 5 further comprising presenting a set of statistics through the statistics application regarding operation of the automatic call distributor to the supervisor through the voice channel.

7. The method of allocating resources as in claim 6 further comprising presenting the supervisor with a set of change options regarding items of the set of statistics at a conclusion of the presentation to the supervisor of the set of statistics.

8. The method of allocating resources as in claim 7 further comprising receiving a selection from the supervisor of the set of change options presented to the supervisor.

9. The method of allocating resources as in claim 8 further comprising transferring control of the autoattendant to a change routine based upon the received selection from the supervisor of the set of change options presented to the supervisor.

10. An apparatus for allocating resources within an automatic call distributor, such apparatus comprising:
    means for receiving an incoming call from a supervisor on a voice channel of the automatic call distributor;
    means for routing the incoming call to an autoattendant of the automatic call distributor;
    means for presenting the supervisor with a set of options regarding the allocation of resources within the automatic call distributor;
    means for receiving a change request from the supervisor; and
    means for executing the change request.

11. The apparatus for allocating resources as in claim 10 further comprising means within the autoattendant for receiving a personal identification number entered by the supervisor.

12. The apparatus for allocating resources as in claim 11 further comprising means for comparing the personal identification number entered by the supervisor with entries of a list of authorized personal identification numbers for reallocating resources within the automatic call distributor.

13. The apparatus for allocating resources as in claim 12 further comprising means for retrieving an application service identifier of a statistics application in response to finding a match between the personal identification number of the supervisor and an entry within the list of authorized personal identification numbers.

14. The apparatus for of allocating resources as in claim 13 further comprising means for transferring control of the autoattendant servicing the supervisor to the statistics application.

15. The apparatus for allocating resources as in claim 14 further comprising means for presenting a set of statistics through the statistics application regarding operation of the automatic call distributor to the supervisor through the voice channel.

16. The apparatus for allocating resources as in claim 15 further comprising means for presenting the supervisor with a set of change options regarding items of the set of statistics at a conclusion of the presentation to the supervisor of the set of statistics.

17. The apparatus for allocating resources as in claim 16 further comprising means for receiving a selection from the supervisor of the set of change options presented to the supervisor.

18. The apparatus for allocating resources as in claim 17 further comprising means for transferring control of the autoattendant to a change routine based upon the received selection from the supervisor of the set of change options presented to the supervisor.

19. An apparatus for allocating resources within an automatic call distributor, such apparatus comprising:
    a call detector adapted to detect an incoming call from a supervisor on a voice channel of the automatic call distributor;
    a switch adapted to route the incoming call to an autoattendant of the automatic call distributor;
    the autoattendant adapted to present the supervisor with a set of options regarding the allocation of resources within the automatic call distributor;
    a tone detector for receiving a change request from the supervisor; and
    a processor for executing the change request.

20. The apparatus for allocating resources as in claim 19 further comprising an identification application within the autoattendant for receiving a personal identification number entered by the supervisor.

21. The apparatus for allocating resources as in claim 20 further comprising a comparator adapted to compare the personal identification number entered by the supervisor with entries of a list of authorized personal identification numbers for reallocating resources within the automatic call distributor.

22. The apparatus for allocating resources as in claim 21 further comprising a pointer register adapted to retrieve an application service identifier of a statistics application in response to finding a match between the personal identification number of the supervisor and an entry within the list of authorized personal identification numbers.

23. The apparatus for of allocating resources as in claim 22 further comprising a supervisory application adapted to transfer control of the autoattendant servicing the supervisor to the statistics application.

24. The apparatus for allocating resources as in claim 23 further comprising a statistics application adapted to present a set of statistics regarding operation of the automatic call distributor to the supervisor through the voice channel.

25. The apparatus for allocating resources as in claim 24 further comprising an options presentation application adapted to present the supervisor with a set of change options regarding items of the set of statistics at a conclusion of the presentation to the supervisor of the set of statistics.

26. The apparatus for allocating resources as in claim 25 further comprising a selection detector adapted to receive a selection from the supervisor of the set of change options presented to the supervisor.

27. The apparatus for allocating resources as in claim 26 further comprising a selection processor adapted to transfer control of the autoattendant to a change routine based upon the received selection from the supervisor of the set of change options presented to the supervisor.

28. A method of allocating resources within an automatic call distributor, such method comprising the steps of:

receiving an incoming call from a supervisor on a voice channel of the automatic call distributor;

routing the incoming call to an autoattendant;

presenting the supervisor with a set of operating parameters of the automatic call distributor;

receiving a change request from the supervisor;

routing the supervisor to an change routine;

receiving a change request from the supervisor; and entering the change request.

* * * * *